May 7, 1963 E. H. SOMMERFIELD 3,089,036
TRANSISTOR PROTECTIVE CIRCUIT
Filed Dec. 29, 1958
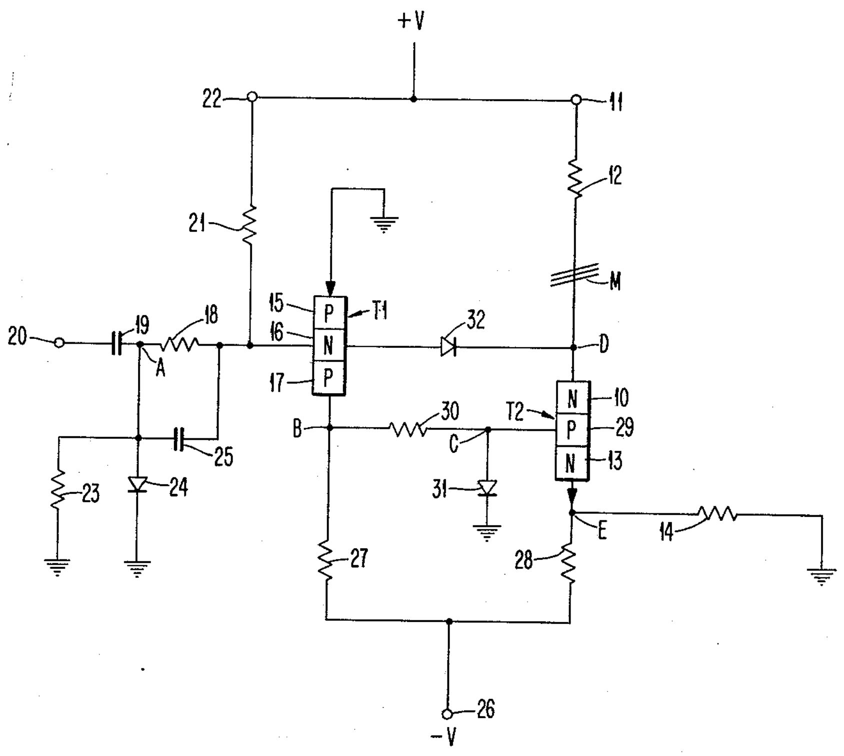
*Inventor*
EDWARD H. SOMMERFIELD
*By* G. R. Gugger
*Agent*

3,089,036
TRANSISTOR PROTECTIVE CIRCUIT

Edward H. Sommerfield, Endicott, N.Y., assignor to International Business Machines Corporation, New York, N.Y., a corporation of New York Filed Dec. 29, 1958, Ser. No. 783,327
9 Claims. (Cl. 307—88.5)

This invention relates to a transistor protective circuit and more particularly to a transistor circuit which is protected in the event power supply potentials should stray or become lost.

It is well known in transistor circuitry that often times the power supply potentials can be lost or can stray sufficiently to cause the power of transistors in the circuit to exceed the maximum transistor dissipation, and as a result, the transistors can be permanently damaged. In transistor circuits which operate under machine ground rules such as, for example, that no power supply potential will be allowed to increase beyond its stated tolerance nor will it be allowed to extend to more than one volt into the opposite polarity, it is extremely desirable that protection features be built into the circuit so that failure of power supply potentials under the above conditions cannot cause any destructive failure of the transistors employed. This is particularly important where the transistor units employed are operating under a "duty-cycle" mode of operation wherein the operating pulses are of relatively narrow width compared with the time of duration of a complete cycle. Under such conditions, the use of fuses and thermally operated devices has proven to be too slow and inadequate a method of protection.

In the embodiment of the present invention, a buffer transistor and a driver transistor are utilized to drive a magnetic core unit, and various protection features are built into the circuit to protect against power supply failures. First, the same potential is used for bias on the base of the buffer transistor and as a collector return for the driver transistor, thus enabling the collector dissipation of the driver transistor to remain within its rated value in the event the buffer transistor should be turned on due to a power supply failure. Secondly, a latch circuit is provided which presents an alternate path for emitter current from the driver transistor in the event the collector voltage or the core load should be inadvertently removed. Also, a novel method of reverse biasing the base-to-emitter of the driver transistor is provided to maintain a current dissipation which is within rated limits in the event that the power supply potential for the driver fails.

In accordance with the above, a primary object of the present invention resides in the provision of a transistor driver circuit which includes means for protecting the transistors in the event power supply potentials stray or become lost.

A further object of the present invention resides in the provision of a transistor circuit employing a buffer transistor and a driver transistor and including means for supplying the same bias potential for the base of the buffer transistor and the collector return of the driver transistor.

A still further object of the present invention resides in the provision of a transistor circuit employing a buffer transistor and a driver transistor and including means for providing an alternate path for emitter current from the driver transistor in the event the driver collector circuit is inadvertently opened.

A still further object of the present invention resides in the provision of a transistor circuit employing a buffer transistor and a driver transistor and including novel means for reverse biasing the base-to-emitter of the driver transistor.

Other objects of the invention will be pointed out in the following description and claims and illustrated in the accompanying drawing, which discloses, by way of example, the principle of the invention and the best mode, which has been contemplated, of applying that principle.

In the drawing:

The FIGURE schematically shows a transistor circuit having the improved protective means connected therein.

Referring to the drawing, T1 designates a junction type transistor which is employed as a buffer to control a second junction type transistor T2. Transistor T2 functions as a driver and is used to drive a magnetic core unit M shown connected in circuit with the collector electrode 10 of the driver T2. Collector electrode 10 and core unit M are returned to a positive voltage terminal 11 through a resistor 12. The emitter electrode 13 of transistor T2 is connected to ground through a resistor 14.

The buffer transistor T1 comprises the emitter electrode 15, base electrode 16 and collector electrode 17 and, as shown, has a grounded emitter configuration. The base electrode 16 is connected by means of an input resistor 18 and capacitor 19 to an input signal terminal 20 which is connected to a suitable negative pulsing source, not shown. Also connected in circuit with the base electrode 16 are a pair of biasing circuits, one comprising the resistor 21 and positive voltage terminal 22, and the other comprising a grounded resistor 23, a grounded diode 24 and a capacitor 25. The capacitor 19 is used to provide protection in case the negative going input signal should stay down or "lock up," and the capacitor 25 in the biasing network speeds up the action on the base 16 of transistor T1. The diode 24 is provided to clamp point A to ground, and the resistor 23 is provided in case diode 24 should fail. Resistor 23 is given a value so that the base of buffer transistor T1 never goes reverse biased to the point of breakdown. If resistor 23 were not provided and diode 24 should fail, the positive and negative bias voltages could reverse bias the buffer transistor T1 and cause it to destroy. The resulting emitter-base short on transistor T1 would cause the driver transistor T2 to forward bias on a D.-C. bias and eventually transistor T2 would be destroyed.

The collector electrode 17 of the buffer transistor and the emitter electrode 13 of the driver transistor are shown connected to a common negative bias voltage terminal 26 through the resistors 27 and 28, respectively. The collector electrode 17 is also connected to the base electrode 29 of the driver transistor T2 by a circuit comprising the resistor 30 and the grounded diode 31. Under normal conditions, a negative going input signal at terminal 20 will switch the buffer transistor T1 into a state of conduction, and the resulting rise in potential at points B and C in the collector circuit will switch the driver transistor T2 also in a state of conduction. Constant current will then flow from the negative voltage terminal 26 through the magnetic core unit M and resistor 12 to the positive voltage terminal 11.

In accordance with the principles of the invention, transistors T1 and T2 are afforded protection in several ways. To take care of the possibility of a loss in power supply potentials, which would result in the transistors burning out, the same positive voltage source is applied to the terminals 11 and 22. Also, the resistors 18 and 21 are designed so that if the positive voltage at terminal 22 drops enough to bias transistor T1 into conduction, even under no input signal conditions, the positive collector voltage at terminal 11 also drops so that the dissipation of the driver transistor T2 will not be exceeded. In other words, the voltage difference between points D and E times the current in transistor T2 will be insufficient to burn out the transistor T2.

With transistor T1 in conduction, current flows from the negative voltage terminal 26 through the base-emitter diode PN of transistor T2, resistor 30 and transistor T1 to ground. Current also flows through the resistor 27 and transistor T1 to ground. Point C is now at ground potential and point E, neglecting any base-emitter drop, is also at ground potential. Current flows through the magnetic core unit M in the output circuit of the driver T2, transistor T2 being a nonsaturating current driver so that the base of buffer T1 remains at ground, and point D never reaches ground under normal conditions. Consequently, diode 31 and a diode 32, which connects the base of buffer T1 with the collector of driver T2, normally never conduct.

The diode 32 is used, as a further measure of protection, to insure that in the event the collector circuit of driver T2 is inadvertently opened under pulse conditions, a sufficient amount of additional base current will flow in buffer T1 to keep it saturated under the heavier loading presented by the base-emitter circuit of the driver T2. The diode 32 presents a higher forward impedance to the current flow going into T1. The buffer T1 must remain saturated and the voltage at point B near or at ground, and with diode 32 in the circuit, as shown, point B will remain at ground due to the fact that the diode provides an alternate path for additional base current to T1 and T1 will carry the emitter current of the driver T2 via resistor 30. As a result, the driver will be maintained in conduction. However, if diode 32 were not in the circuit and the driver collector circuit was inadvertently opened, buffer T1 would see the resistance 28 plus the forward drop of the base-emitter junction of the driver T2 as an additional load. This would overload the buffer T1 with the potential at point B trying to rise to the point where buffer T1 will burn out.

Another protective feature of the present invention resides in the manner in which the single reverse bias voltage at terminal 26 is applied to the emitter of driver T2 rather than to the base connection. When driver T2 is conducting, the emitter is practically at ground and practically no current flows in the resistor 14. Resistor 14 therefore has very little effect during "on" time. When buffer T1 is off, the base potential of the driver is determined by the negative voltage at terminal 26, the resistance 27 and the collector currents. The emitter potential is determined by the negative voltage at terminal 26, resistance 28 and the bleeder current. Since the bleeder current is more or less determined by the resistance 14, this resistance could be made independently adjustable to insure that driver T2 is off.

Also, under either pulse or no pulse conditions and with the magnetic core M either in the collector circuit or inadvertently left out, if the negative voltage at the terminal 26 should become lost, the potential at the terminal will rise toward ground and a point will be reached at which the difference in voltage between points C and E (base and emitter) will approach 0. The driver T2 will start to turn on and conduct, and as the voltage becomes more positive, more current will flow in the driver and the power dissipation will increase. When the voltage reaches ground, the power of the driver will be limited by the sum of resistances 12 and 28 to a value which is below maximum dissipation, and the transistor driver will not be damaged. If the voltage at terminal 26 goes above ground due to a fault in the power supply, the diode 31 will clamp the base 29 at ground potential, and the potential at point E goes positive to effect cutoff of the driver T2.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A transistor circuit comprising in combination, a buffer transistor and a driver transistor, said transistors each having a collector, base and emitter electrode, a first biasing means connected to the collector of said buffer and the emitter of said driver, a second biasing means connected to the base of said buffer and the collector of said driver, said biasing means normally maintaining said transistors in a state of nonconduction, input signal means connected to the base of said buffer for switching said buffer into a state of conduction, means connecting the collector output of said buffer to the base of said driver to switch said driver into a state of conduction, a load circuit connected to the collector of said driver and including a source of collector voltage, and diode switch means connecting the collector of said driver with the base of said buffer to provide an alternate path for additional base current to said buffer only in the event said collector voltage is inadvertently removed or said load circuit opened.

2. A transistor circuit comprising in combination, a buffer transistor and a driver transistor, said transistors each having a collector, base and emitter electrode, a first and second source of bias voltage for normally maintaining said transistors in a state of nonconduction, circuit means connecting said first voltage source to the collector of said buffer and the emitter of said driver, circuit means connecting said second voltage source to the base of said buffer and to the collector of said driver, input signal means connected to the base of said buffer for switching said buffer into a state of conduction, means connecting the collector output of said buffer to the base of said driver to switch said driver into a state of conduction, an inductive load means in said driver collector circuit, and a diode switch circuit connecting the collector of said driver with the base of said buffer to provide additional base current to said buffer, only in the event said driver collector circuit should be inadvertently opened, in order to maintain said buffer transistor saturated under the heavier loading presented by the base-emitter circuit of said driver transistor.

3. A transistor circuit comprising in combination, a buffer transistor and a driver transistor, said transistors each having a collector, base and emitter electrode, a first and second source of bias voltage for normally maintaining said transistors in a state of nonconduction, circuit means connecting said second voltage source to the base of said buffer and the collector of said driver, input signal means connected to the base of said buffer for switching said buffer into a state of conduction, means connecting the collector output of said buffer to the base of said driver to switch said driver into a state of conduction, an inductive load means in said driver collector circuit, circuit means connecting said first voltage source to the collector of said buffer and the emitter of said driver, said first voltage source normally being effective to reverse bias the emitter of said driver with respect to its base, and impedance means in said last circuit means for limiting the power of said driver transistor to a value below maximum dissipation in the event said driver transistor switches into conduction due to a loss in said first voltage source.

4. A transistor circuit as in claim 3 wherein said means connecting the collector output of said buffer to the base of said driver includes a grounded diode for clamping the base of said driver at ground potential when the loss in said first voltage source goes beyond ground potential to effect cut-off of said driver transistor.

5. A transistor circuit comprising in combination, a first transistor having collector, base and emitter electrodes and having a PNP configuration, a second transistor having collector, base and emitter electrodes and having an NPN configuration, input signal means connected to the base of said PNP transistor, means connecting the collector output of said PNP transistor to the base of said NPN transistor, load means in circuit with the collector of said NPN transistor, a source of negative bias potential, circuit means for connecting said negative potential to the collector of said PNP transistor and to the emitter of said NPN transistor, a source of positive bias potential, and circuit means for connecting said positive potential to the base of said PNP transistor and the collector of said NPN transistor whereby inadvertent switching of said PNP transistor from a nonconducting state to a conducting state due to loss of said positive potential results in said NPN transistor conducting with said loss in positive voltage also reflected at its collector to maintain the collector dissipation of said NPN transistor within a rated value.

6. A transistor circuit comprising in combination, a first transistor having collector, base and emitter electrodes and having a PNP configuration, a second transistor having collector, base and emitter electrodes and having an NPN configuration, a source of positive voltage connected to the base of said PNP transistor and to the collector of said NPN transistor, a source of negative voltage connected to the collector of said PNP transistor and to the emitter of said NPN transistor, input signal means connected to the base of said PNP transistor for switching same into a state of conduction, means connecting the collector output of said PNP transistor to the base of said NPN transistor to switch the NPN transistor into a state of conduction, a magnetic core in circuit between the collector of said NPN transistor and said positive voltage, and a diode circuit connecting the collector of said NPN transistor with the base of said PNP transistor to provide an alternate path for base current to the PNP transistor, in the event said positive voltage or said magnetic core should be inadvertently removed, and thus enabling said PNP transistor to carry emitter current from said NPN transistor.

7. A transistor circuit comprising in combination, a first transistor having collector, base and emitter electrodes and having a PNP configuration, a second transistor having collector, base and emitter electrodes and having an NPN configuration, a source of positive voltage, circuit means connecting said positive voltage to the base of said PNP transistor and to the collector of said NPN transistor, input signal means connected to the base of said PNP transistor, means connecting the collector of said PNP transistor to the base of said NPN transistor, inductive load means in circuit with the collector of said NPN transistor, a source of negative voltage, circuit means connecting said negative voltage to the collector of said PNP transistor and to the emitter of said NPN transistor to reverse bias the emitter-base of said NPN transistor, and impedance means in said last circuit means for limiting the power of said NPN transistor to a value below maximum dissipation in the event said NPN transistor switches into conduction due to a loss in said negative voltage.

8. A transistor circuit as in claim 7 wherein said means connecting the collector output of said PNP transistor to the base of said NPN transistor includes a grounded diode for clamping the base of said NPN transistor at ground potential and effecting cutoff of the NPN transistor in the event said negative voltage should swing positive.

9. A transistor circuit comprising in combination, a buffer transistor and a driver transistor, said transistors each having a collector, base and emitter electrode, first and second sources of bias potential and an intermediate reference potential, a load circuit connecting the collector of the driver transistor to the first source, impedance elements connecting the collector of the buffer transistor and the emitter of the driver transistor to the second source, circuit means independent of the state of conduction of the driver and including a voltage divider connected between the first source and the reference potential and connected to the base of the buffer transistor for normally biasing the buffer transistor off, alternating current input signal means connected to the base of the buffer transistor for turning the latter on, and means coupling the base of the driver transistor to the collector of the buffer transistor for turning on the driver transistor when the buffer transistor is turned on, whereby inadvertent switching of said buffer into a sate of conduction due to a failure of said first source will result in said driver conducting with the collector dissipation of said driver maintained within a rated value.

References Cited in the file of this patent

UNITED STATES PATENTS

| | | |
|---|---|---|
| 2,831,113 | Weller | Apr. 15, 1958 |
| 2,832,900 | Ford | Apr. 29, 1958 |
| 2,840,727 | Guggi | June 24, 1958 |

OTHER REFERENCES

Electronics (engineering edition), Feb. 28, 1958, pages 64 and 65, "D.C. Transistor Amplifier for High-Impedance Input," Shuster.